(12) United States Patent
Tempea et al.

(10) Patent No.: US 7,180,670 B2
(45) Date of Patent: Feb. 20, 2007

(54) CHIRPED MULTILAYER MIRROR

(75) Inventors: Gabriel Florin Tempea, Vienna (AT); Ferenc Krausz, Vosendorf (AT)

(73) Assignee: Femtolasers Produktions GmbH (AT)

( * ) Notice: Subject to any disclaimer, the term of this patent is extended or adjusted under 35 U.S.C. 154(b) by 0 days.

(21) Appl. No.: 10/469,218

(22) PCT Filed: Feb. 21, 2002

(86) PCT No.: PCT/AT02/00057

§ 371 (c)(1),
(2), (4) Date: Aug. 26, 2003

(87) PCT Pub. No.: WO02/068999

PCT Pub. Date: Sep. 6, 2002

(65) Prior Publication Data

US 2004/0085661 A1 May 6, 2004

(30) Foreign Application Priority Data

Feb. 26, 2001 (AT) ................................ A 302/2001

(51) Int. Cl.
*G02B 5/28* (2006.01)
(52) U.S. Cl. .................. 359/584; 359/588; 359/883; 359/900
(58) Field of Classification Search ............... 359/580, 359/584, 588, 831, 833, 837, 883, 884, 900
See application file for complete search history.

(56) References Cited

U.S. PATENT DOCUMENTS

| | | | | |
|---|---|---|---|---|
| 3,565,508 A | | 2/1971 | Dumont .................... 350/157 |
| 4,284,323 A | | 8/1981 | Jankowitz .................... 350/1.6 |
| 4,957,371 A | * | 9/1990 | Pellicori et al. |
| 4,958,363 A | * | 9/1990 | Nelson et al. |
| 5,441,803 A | | 8/1995 | Meissner .................... 428/220 |
| 5,734,503 A | | 3/1998 | Szipócs et al. ............. 359/584 |
| 5,846,638 A | | 12/1998 | Meissner .................... 428/220 |
| 6,115,401 A | * | 9/2000 | Scobey et al. ............. 372/100 |
| 6,256,434 B1 | * | 7/2001 | Matuschek et al. ........... 385/37 |
| 6,873,464 B1 | * | 3/2005 | Krausz et al. ............. 359/584 |
| 2002/0131047 A1 | * | 9/2002 | Zarrabian et al. ........... 356/454 |

FOREIGN PATENT DOCUMENTS

| | | |
|---|---|---|
| EP | 0 533 362 | 3/1993 |
| GB | 1 305 700 | 2/1973 |

(Continued)

OTHER PUBLICATIONS

Andreas Stingl et al. "Generation of 11-fs pulses from a Ti:sapphire laser without the use of prisms" Optics Letters, vol. 19, No. 3, pp. 204-206, Feb. 1994.
Robert Szipöcs et al. "Chirped Multilayer Coatings for Broadband Dispersion Control in Femtosecond Lasers" Optics Letters, vol. 19, No. 3, pp. 201-203, Feb. 1994.

(Continued)

*Primary Examiner*—Ricky D. Shafer
(74) *Attorney, Agent, or Firm*—Ostrolenk, Faber, Gerb & Soffen, LLP

(57) ABSTRACT

A dispersive multilayer mirror (1) comprising several individual layers (2, 3) applied to a carrier substrate (4) and adjoining each other via parallel, plane surfaces having different optical constants and different thicknesses, wherein a wedge-shaped glass platelet (5) is fastened to the outermost individual layer (2) facing away from the carrier substrate (4) by optical contact.

5 Claims, 4 Drawing Sheets

FOREIGN PATENT DOCUMENTS

| | | |
|---|---|---|
| GB | 2 054 195 | 2/1981 |
| WO | WO 00/11501 | 3/2000 |
| WO | 01 05000 | 1/2001 |
| WO | 01 42821 | 6/2001 |

OTHER PUBLICATIONS

F.X. Kärtner et al. "Design and Fabrication of Double-Chirped Mirrors" Optics Letters, vol. 22, No. 11, pp. 831-833, Jun. 1, 1997.
International Search Report.

* cited by examiner

CHIRPED MULTILAYER MIRROR

BACKGROUND OF THE INVENTION

The invention relates to a dispersive multilayer mirror comprising several individual layers applied to a carrier substrate and adjoining each other via parallel, plane interfaces and having different optical constants and different thicknesses. Such a mirror can be employed in laser devices so as to produce a given—negative or positive—group delay dispersion.

Furthermore, the invention relates to a method of producing such a multilayer mirror.

Ultrashort laser pulses (having pulse durations in the picosecond and femtosecond range) have a broad spectrum in the frequency range. Pulses with spectra which span an entire optic octave (between 500 nm and 1000 nm) have been demonstrated, and sources yielding pulses with a spectral width of approximately 200 nm (centered at 800 nm), are already commercially available. To form a short pulse in the time range, the frequency components of broad-band signals must also coincide. Because of the dependency of the refraction index on the wave length (also called "dispersion"), different components of the spectrum are differently delayed when passing through a dense optic medium. To describe this effect in terms of quantity, the group delay dispersion, or GDD in short, has been introduced as the second derivation of the spectral phase with respect to the angular frequency. The duration of a laser pulse remains unchanged when passing an optical system if the resultant GDD of the system is zero. If the system has a GDD≠0, the duration of the pulse at the exit from the optic system will have a different value than at its entry. To counteract these pulse changes, the GDD of the optical system must be compensated, i.e. a GDD with the same amount, yet a different preceding sign must be introduced. Various optical components have already been developed for carrying out this dispersion compensation, such as, e.g., prism pairs, gridpairs and dispersive mirrors (cf. e.g., U.S. Pat. No. 5,734,503 A and R. Szipocs et al., "Chirped multilayer coatings for broadband dispersion control in femtosecond lasers", Optical Letters 1994, vol. 19, pp. 201–203, or WO 00/11501 A). On account of their great band width, the user friendliness and compactness, dispersive multilayer mirrors (so-called chirped mirrors, CMs) are used more and more frequently both for scientific and also for industrial applications.

During the reflection on a CM mirror, the different wave length components of the laser beam penetrate the layers of the mirror to different-depths before they are reflected. In this manner, the different frequency components are delayed differently long, corresponding to the respective depth of penetration. Since many optical components have a positive GDD, in most instances a negative GDD is required for the GDD compensation. To achieve a negative GDD, the short-wave wave packets are reflected in the upper layers of the CM mirror, while the long-wave portions enter more deeply into the mirror before they are reflected. In this manner, the long-wave frequency components are temporally delayed relative to the short-wave components, leading to the desired negative GDD. However, there are also applications in which a positive GDD is desired for compensation purposes.

One problem with these CM mirrors and, quite generally, with comparable multilayer mirrors consists in that at the interface of the uppermost layer relative to the environment, i.e. at the front face where the radiation impacts, a reflection that is largely independent of the wave length occurs (e.g. in the order of 3%). As a consequence, interferences occur between beams which are reflected at this front face, and beams which are reflected at a deeper point within the multilayer structure of the mirror, these interference effects possibly causing a distortion of the reflection ability and, above all, a marked distortion of the phase and dispersion characteristics of the mirror. To at least partially counteract this effect, it has already been suggested (cf. F. X. Kärntner et al., "Design and fabrication of double-chirped mirrors", 1997, Opt. Lett. 22, 831; and G. Tempea et al., "Dispersion control over 150 THz with chirped dielectric mirrors", 1998, IEEE JSTQE 4, 193, respectively) to apply an anti-reflective coating or a narrow-band suppression filter at the front face, i.e. at the interface to the ambiance (air, as a rule). To effectively suppress interfering resonances, the reflection at the front face should be in the order of merely 10–4%. Anti-reflection layers and suppression filters are, however, capable of approximating such properties over a very limited band width. Accordingly, dispersive multilayer mirrors in the past could be operated at 800 nm radiation over band widths of 150–160 THZ only. Moreover, a total suppression of the resonance interference effects is not even possible over such a band width, and the dispersion curve often shows marked fluctuations.

These interference effects which are caused by beams reflected at the front surface of the mirror can as such be effectively avoided, i.e. by means of a so-called TFI-mirror (TFI—tilted front interface), cf. the older, not pre-published WO 01/42821 A1): If the front face of the mirror is slightly "tilted" relative to the other interfaces, the beam which is reflected at this front face will propagate in another direction than the useful beam reflected by the mirror proper, so that it can no longer interfere with the latter in this far field. With this design, the band width of the dispersive mirrors can be increased by up to an optic octave. Although the structure of a TFI mirror in principle is simple, the production of such components does, however, pose several technological problems. In most instances, a TFI mirror must introduce a negative GDD, which can be achieved by means of a dispersive layer arrangement as described above; the wedge-shaped front layer, however, introduces a positive GDD which reduces the negative contribution of the mirror layers proper. In order not to substantially negatively affect the net dispersion of the mirror, the wedge-shaped layer should be as thin as possible. However, this wedge-shaped layer cannot have an arbitrary thinness because the wedge angle must have a certain minimum value so as to ensure an effective separation of the two beams. The ideal parameter of this layer, taking into consideration the above-indicated aspects, are: a wedge angle of H1°, and a thickness of approximately 20 μm to 50 μm at the thinnest edge. Such a thick layer cannot be produced by means of conventional coating methods (such as electron beam vapor deposition or magnetron sputtering). Therefore, there exist only the following two possibilities: (1) the uppermost wedge-shaped layer on the side on which the beam impacts is made of a thin, wedge-shaped platelet as carrier substrate, on which the other layers (the dispersive individual layers and an anti-reflection coating) are applied by a coating method; (2) the individual layers with the parallel interfaces are applied to a conventional thick optic carrier substrate by a coating method, and on these individual layers, subsequently a thin wedge-shaped platelet is applied or produced by means of a special technological method different from a coating method. A disadvantage of method (1) consists in that the surface quality of the TFI mirror will be negatively affected by the tensions in the layers. Since the carrier substrate must be thin, the slightest tensions (which are unavoidable in a vapor deposition or sputtering coating) will lead to an arching or irregularity of the thin wedge-shaped substrate. The second possible way does not harbor this problem because the carrier substrate may have any thickness desired. In this instance it must, however, be ensured that an impedance adaptation is realized between the individual layers of the mirror and the wedge-shaped platelet so as to avoid the previously described interference effects. For this purpose, the use of an index adaptation fluid (also IMF index matching fluid) has been suggested (cf. the older, not pre-published WO 01/42821 A). In this manner, a nearly perfect impedance adaptation is achieved, because the commercially available IMFs are capable of reproducing the refractive index of glass with a precision of 10-4. Yet also in this instance, the surface quality of the mirror is not satisfactory, because there is no tight connection between the thin wedge-shaped platelet and the multilayer structure of the multilayer mirror; due to the slight thickness, the quasi-free standing wedge-shaped platelet cannot have a surface quality of $\lambda/10$ (as is common in laser technology).

For the sake of completeness, it should be pointed out that wedge-shaped optic multilayer components have already been suggested for most varying applications, such as, e.g., for suppression filters, interference light filters, wave-length selective mirrors, beam dividers or the like, wherein, in particular, comparatively thick wedge platelets are used as substrate for multilayer structures (GB 1,305,700 A; EP 416 105 A; EP 533 362 A; U.S. Pat. No. 4,284,323 A; GB 2,054,195 A=DE 3 026 370 A). Thus, these are components different from dispersive multilayer mirrors which shall cause a certain group delay dispersion wherein, moreover, the usual coating techniques are used with the afore-mentioned disadvantages as regards laser quality etc.

SUMMARY OF THE INVENTION

It is an object of the invention to provide a multilayer mirror as well as a method of producing the same, wherein the above-described disadvantages of the previously suggested solutions are eliminated and both an ideal impedance adaptation of the mirror to the outer medium and a surface quality (e.g. in the range of from $\lambda/6$–$\lambda/10$) suitable for the laser applications are made possible.

The inventive dispersive multilayer mirror of the initially defined kind is characterized in that on the outermost individual layer facing away from the carrier substrate, a wedge-shaped glass platelet is fastened by optically contacting.

By applying a wedge-shaped glass platelet by optically contacting, a high optical quality is ensured, and the detrimental interference effects between the useful beam reflected in the mirror interior and a beam reflected at the mirror front side are avoided.

To achieve a high degree of effectiveness, it is furthermore suitable if an anti-reflection coating known per se is applied on the wedge-shaped glass platelet that has been fastened by optically contacting.

In the production of the present mirror, it is preferably proceeded such that after the application of the individual layers of the mirror on a optically polished carrier substrate which is thick as compared to the individual layers, on the outermost individual layer a plane-parallel glass platelet is fastened by means of optical contacting and then is polished, a wedge shape and a reduction of the thickness of the glass platelet being caused by this polishing. In particular, a glass platelet having a thickness which makes it possible to obtain a surface evenness of between $\lambda/4$ and $\lambda/10$ is fastened to the outermost individual layer by optically contacting.

Optically contacting as a connection technique between glass elements has been known as such for quite some time, c.f., e.g., U.S. Pat. No. 5,846,638 A, U.S. Pat. No. 5,441,803 A and U.S. Pat. No. 3,565,508 A, the contents of which is included herein by reference thereto. By optically contacting, a bond of high optical quality can be achieved between two surfaces. By means of this technique, faultless interfaces can be produced which do not introduce losses due to scatter. If the materials between which the optical contact is realized have the same optical proper-ties, the interface will not introduce any reflection losses or phase distortions, either. Optic contact can, however, only be realized between highly planar surfaces. Optical components having a thickness which is one fourth to one third of the diameter can have the required surface quality. For optically contacting, in principle, an evenness in the range of from e.g. 1/6 to 1/10 is suitable, and the surface of a glass platelet having a thickness of only 50 μm to 100 μm cannot meet this condition. Accordingly, a glass platelet having a thickness which ensures the required surface quality is to be optically contacted with the layer structure on the carrier substrate. After the connection has been made by optic contacting, the glass platelet is obliquely polished by a method known per se so as to achieve the desired wedge angle and the desired thick-ness. To reduce the reflection losses, subsequently an anti-reflection coating can be applied to the front face of the wedge-shaped glass platelet. The resistance of the connection by optic contacting relative to environmental influences (mainly temperature fluctuations and humidity) can be increased by a suitable thermal treatment, e.g. as is known as such from U.S. Pat. No. 5,441,803 A r U.S. Pat. No. 5,846,638 A. In this manner, a good longtime stability of the mirror is obtained.

BRIEF DESCRIPTION OF THE DRAWING

In the following, the invention will be described in more detail by way of particularly preferred exemplary embodiments to which, however, it shall not be restricted, and with reference to the accompanying drawings. Therein, FIG. 1 schematically shows the construction of a dispersive multilayer mirror having a wedge-shaped front glass platelet.

DETAILED DESCRIPTION OF THE INVENTION

Figure 1:
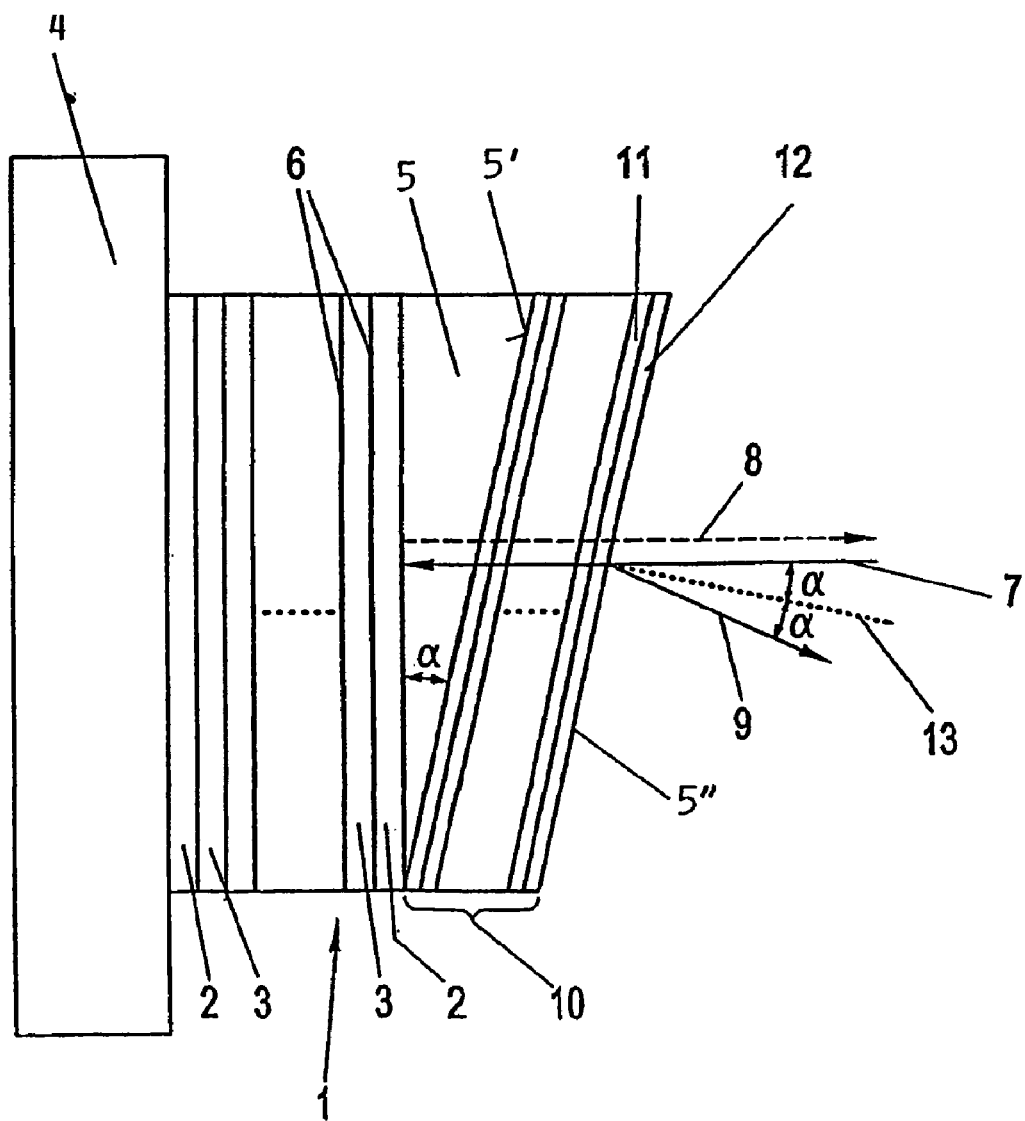

In FIG. 1, a dispersive multilayer mirror 1 is schematically illustrated which is constructed e.g. of individual layers 2 having a relatively low refractive index and individual layers 3 having a relatively high refractive index. These individual layers 2, 3 are alternatingly arranged in the example shown, and a total of e.g. 30 to 70 individual layers 2, 3 may be present. These individual layers 2, 3 are applied to the front side of a relatively thick carrier substrate 4 in a per se conventional manner, e.g. by deposition from the vapor phase. On the front side of the layered structure comprising the individual layers 2, 3, a wedge-shaped glass platelet 5 having a wedge angle a is applied so that a front face 5' is obtained which extends inclined under the angle α as compared to the interfaces 6 between the individual layers 2, 3.

A beam 7 arriving at the front face 5', in particular a laser beam, passes through the glass platelet 5 and, depending on the wave lengths of its individual frequency components, will be reflected at a point more or less deep in the multilayer structure 2, 3 of the mirror 1 at the respective interfaces 6 to thus achieve the initially described dispersion control for the reflected beam 8. As a rule, here, a negative group delay dispersion GDD will be provided, waves with greater wave lengths, for the purpose of a more pronounced delay, entering more deeply into the multilayer structure 2, 3 than short-wave portions which are reflected further outwards in the mirror 1. However, cases are also possible in which a positive GDD is to be introduced.

As has been shown, without an inclined front face, normally a detrimental—even though slight—reflection will normally occur at the front face of mirror 1, the beam reflected here causing interferences with the beams reflected within the individual layers 2, 3 of the multilayer structure of mirror 1, resulting in pronounced distortions of the reflection ability and the phase characteristics of the mirror. To avoid these interference effects, as has been mentioned, as a consequence of the wedge-shaped glass platelet 5, the front face 5' is arranged under an inclination relative to the remaining interfaces 6, so that the beam 9 reflected at the front side 5' of mirror 1 will be reflected under an angle equal to twice the angle of inclination a of the front face 5'. By this, this inclinedly reflected beam 9 is no longer an interfering factor, at least at a relatively short distance, since, depending on the angle of inclination a of the front face 5' as well as on the diameter of the incoming beam 7, already after a relatively short length of propagation, in the range of a few centimeters, it is completely separated from the useful beams 7 and 8, so that as from this distance, phase-disturbing interference effects can no longer occur.

Since the inclinedly reflected beam 9 contributes to the losses of mirror 1, an anti-reflective (AR antireflection) coating 10 is preferably applied on the front face 5' of the wedge-shaped glass platelet 5 in a manner known per se, which coating may consist of several individual layers 11, 12 of alternately less highly refractive layers 11 and more highly refractive layers 12, respectively. For this AR coating 10, e.g. alternately titanium oxide (TiO2) and silicon oxide (SiO2) layers, or tantalum pentoxide (Ta2O5) and silicon oxide (SiO2) layers may be used in a per se conventional manner, wherein as a rule less than 15 layers will suffice, and by this AR coating 10 no phase distortions are introduced. With such an AR coating 10 it is possible to lower the reflection ability at what is now the outer front face 5''' (interface of mirror 1 to the surroundings) in the interesting wave length range of from 500 nm to 1000 nm to below 0.2%.

For the sake of completeness, in FIG. 1 furthermore the line 13 perpendicular to the surface is drawn which is perpendicular to the outer front face 5''' and forms the line of symmetry of the angle between the incoming beam 7 and beam 9 which is inclinedly reflected at front face 5'''.

To construct a mirror 1 according to FIG. 1, e.g. the following layer structure may be chosen:

| Material Wedge-shaped glass platelet 5 | Layer thickness (nm) |
|---|---|
| $SiO_2$ | 259.80 |
| $TiO_2$ | 15.00 |
| $SiO_2$ | 61.38 |
| $TiO_2$ | 59.12 |
| $SiO_2$ | 18.81 |
| $TiO_2$ | 79.30 |
| $SiO_2$ | 72.89 |
| $TiO_2$ | 21.16 |
| $SiO_2$ | 118.24 |
| $TiO_2$ | 56.13 |
| $SiO_2$ | 30.30 |
| $TiO_2$ | 75.66 |
| $SiO_2$ | 96.41 |
| $TiO_2$ | 33.40 |
| $SiO_2$ | 76.25 |
| $TiO_2$ | 76.31 |
| $SiO_2$ | 80.31 |
| $TiO_2$ | 35.10 |
| $SiO_2$ | 108.49 |
| $TiO_2$ | 73.01 |
| $SiO_2$ | 72.73 |
| $TiO_2$ | 48.58 |
| $SiO_2$ | 102.70 |
| $TiO_2$ | 76.02 |
| $SiO_2$ | 95.01 |
| $TiO_2$ | 42.53 |
| $SiO_2$ | 100.45 |
| $TiO_2$ | 97.86 |
| $SiO_2$ | 100.47 |
| $TiO_2$ | 50.81 |
| $SiO_2$ | 93.09 |
| $TiO_2$ | 82.43 |
| $SiO_2$ | 132.75 |
| $TiO_2$ | 76.17 |
| $SiO_2$ | 84.22 |
| $TiO_2$ | 69.18 |
| $SiO_2$ | 148.68 |
| $TiO_2$ | 78.55 |
| $SiO_2$ | 117.82 |
| $TiO_2$ | 79.60 |
| $SiO_2$ | 154.27 |
| $TiO_2$ | 78.25 |
| $SiO_2$ | 116.50 |
| $TiO_2$ | 109.89 |
| $SiO_2$ | 143.51 |
| $TiO_2$ | 89.85 |
| $SiO_2$ | 158.38 |
| $TiO_2$ | 76.01 |
| $SiO_2$ | 174.52 |
| $TiO_2$ | 86.94 |
| $SiO_2$ | 186.03 |
| $TiO_2$ | 96.81 |
| $SiO_2$ | 167.78 |
| $TiO_2$ | 106.09 |
| $SiO_2$ | 191.54 |
| $TiO_2$ | 120.83 |
| $SiO_2$ | 187.05 |
| $TiO_2$ | 122.09 |
| $SiO_2$ | 307.80 |

Carrier Substrate 4

Figure 3:
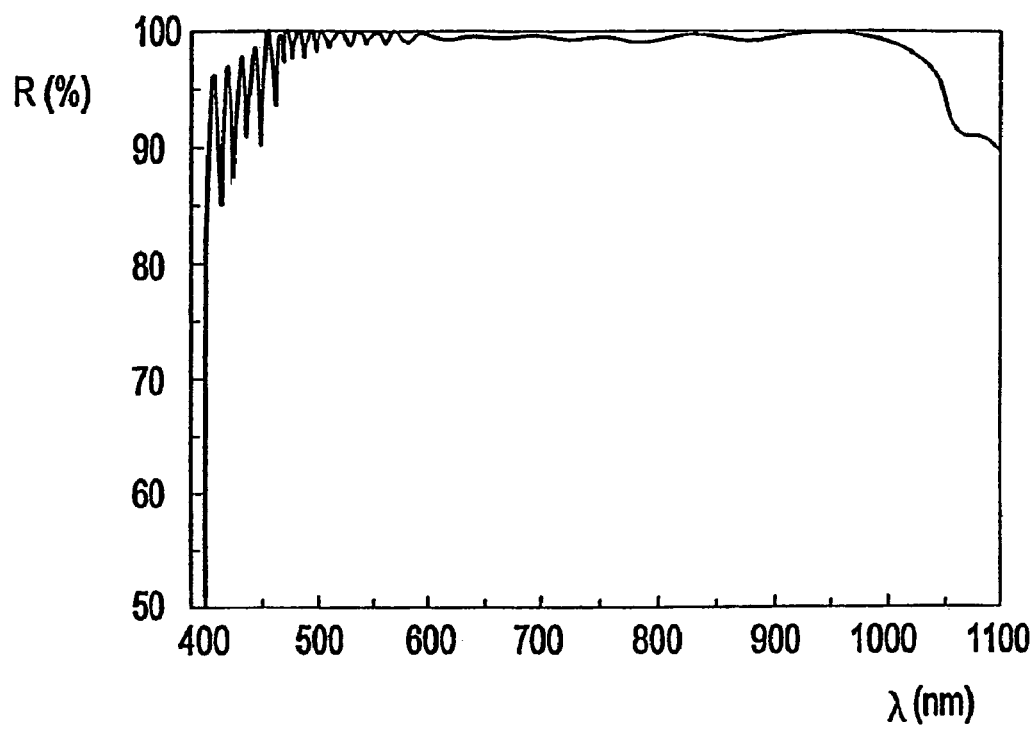
FIG. 3 diagrammatically shows the reflectivity R of a mirror according to FIG. 1 vs. the wave length $\lambda$.
Figure 4:
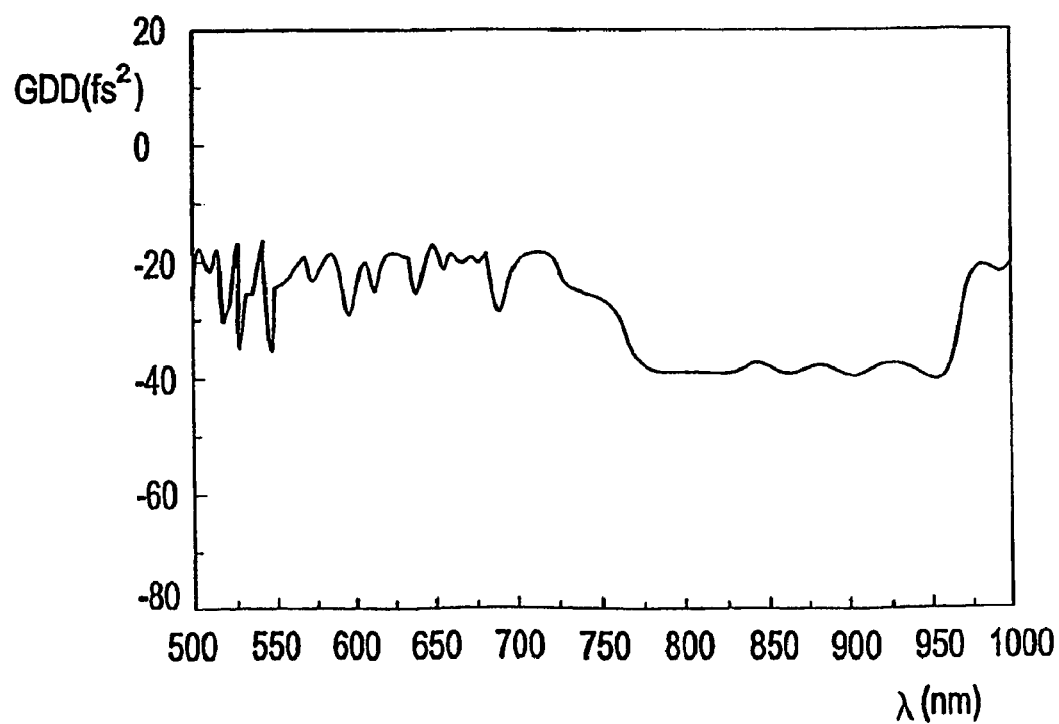
FIG. 4 diagrammatically shows the group delay dispersion GDD of the mirror according to FIG. 1 vs. the wave length $\lambda$.

For such a mirror, the reflection ability R (in %) has been illustrated in FIGS. 3 and 4 according to a computer simulation vs. the wave length 1 (in nm), and the group delay dispersion GDD (in fs2) vs. the wave length 1 (in nm). As is visible from FIG. 3, the reflectivity R in the wave length range of from 500 nm to 1000 nm is practically constant; the GDD shown in FIG. 4 is negative and has a slightly wavy course; in the region of the higher wave lengths the—negative—GDD is larger in term of amount.

The individual layers 2, 3 of the multilayer mirror 1 may have varying thicknesses, depending on the case of application and depending on the distance from the glass platelet 5, and in particular, they may have layer thicknesses increasing generally on an average with this distance to thus achieve a negative GDD or a high reflectivity R in certain spectral regions, respectively.

The mirror 1 may be a so-called chirped mirror (CM mirror), it may, however, also be a resonant layer structure. The individual layers 2, 3 may, moreover, also be per se conventional semiconductor layers so as to install in this manner saturable absorber layers in the mirror structure.

Figure 2:
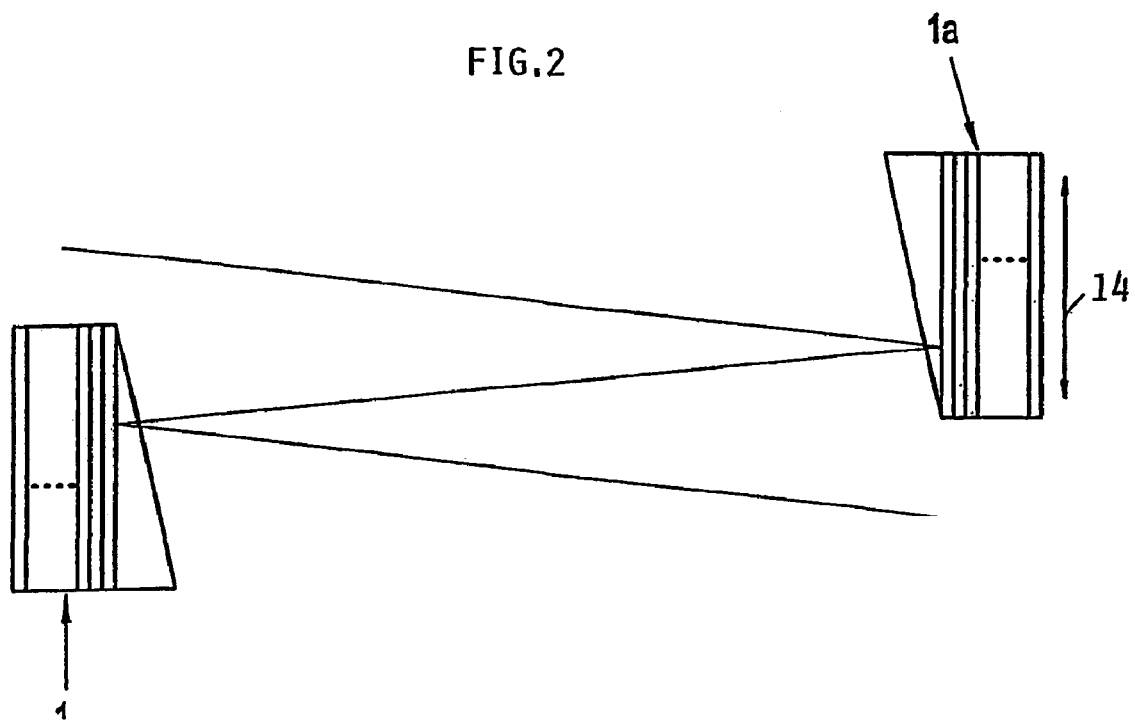
FIG. 2 shows an arrangement comprising two dispersive multilayer mirrors, e.g. according to FIG. 1, for compensating a spatial dispersion (angular dispersion)

To avoid a spatial (angular) dispersion, or to compensate therefor, respectively, it is suitable to use mirrors 1 with an inclined front face 5' and 5'', respectively, as described here, in pairs, as is visible from FIG. 2. In this manner, the angular dispersion which is introduced by one mirror 1 will be compensated by the other mirror, e.g. mirror 1a in FIG. 2. Moreover, such an arrangement with pairs of mirrors 1, 1a allows for an exact adaptation of the total dispersion, one of the mirrors, e.g. mirror 1a, being displaced in transverse direction, as schematically illustrated by arrow 14 in FIG. 2.

By the described front-side wedge-shaped glass platelet 5 of the present multilayer mirror 1, the impedance mismatching at the outermost interface (front face 5 or 5', respectively), is avoided, and the permeability below the high-reflection band of mirror 1 is substantially improved, since interference bands of higher order are partially suppressed. Accordingly, the present mirror 1 can exhibit a high reflectivity R and a constant group delay dispersion GDD in the wave length range of from 600 nm to 950 nm, as well as a high permeability near the usual pump beam wave length (520 to 540 nm). The transmission of a Bragg mirror at the pump beam wave length may also be increased by inclinedly positioning the foremost interface relative to the remaining interfaces 6 of the layered structure. The present mirror 1 is not as sensitive as regards deviations from the nominal thickness of the individual layers 2, 3 as conventional chirped mirrors in which already relatively minor production errors can lead to pronounced fluctuations, in particular in the GDD curve.

A high stability and optical quality of the present mirror 1 is achieved in that an impedance adaptation between the multilayer structure 2, 3 proper and the uppermost wedge-shaped glass platelet 5 is achieved independently of the layered structure.

Figure 5:
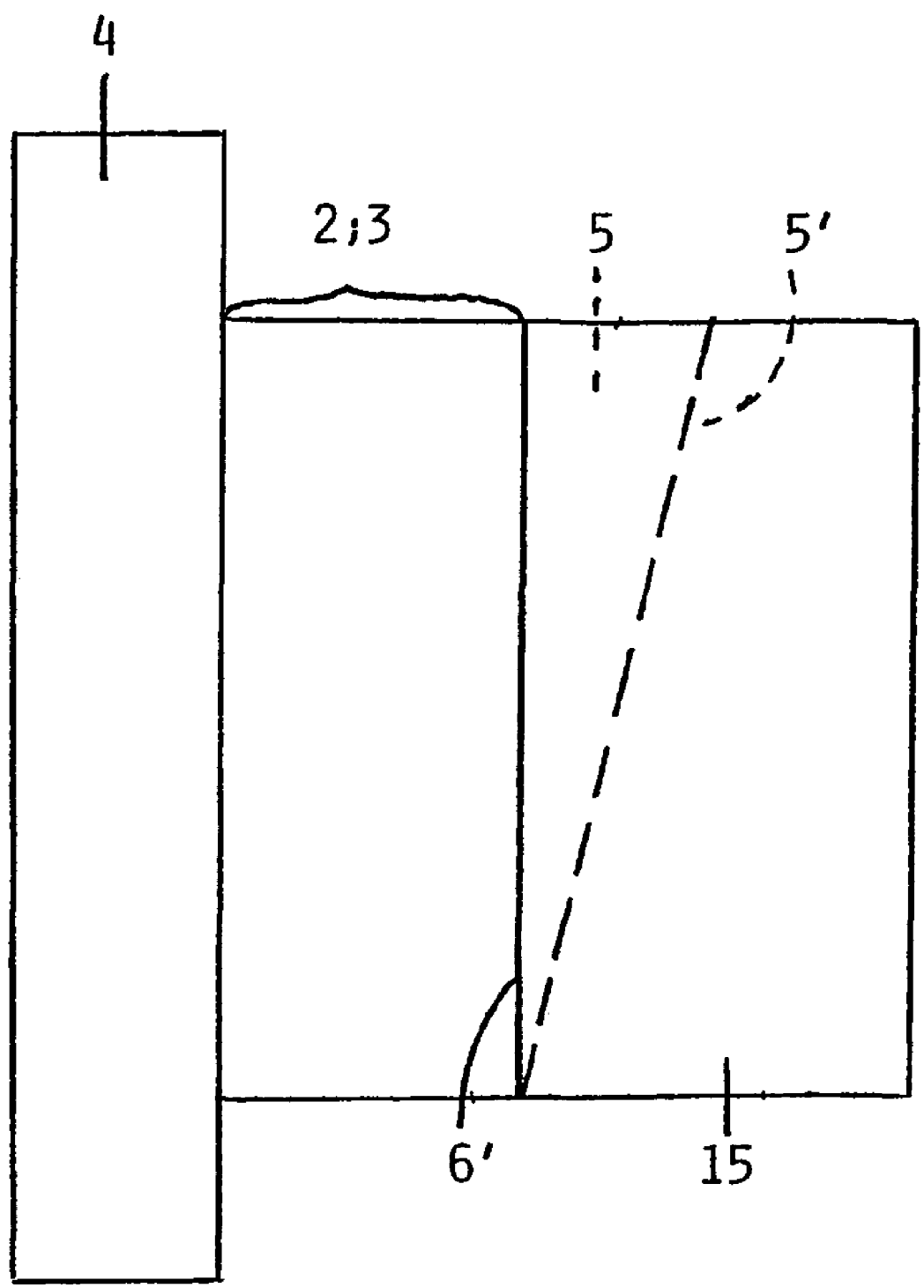
FIG. 5 schematically shows the mirror arrangement in an intermediate stage during its production.

To obtain these properties, such as in particular the high optical quality and the impedance matching, respectively, at the interface between the glass platelet 5 and the layer structure 2; 3, the glass platelet 5 is attached to the layer structure 2; 3 by the technique of optical contacting. In this manner, the surface quality of the glass platelet 5 is improved, and an ideal impedance matching is obtained. To attach the wedge-shaped glass platelet 5 by optically contacting, however, a certain minimum thickness of the glass platelet 5 must be observed, e.g. in the range of from 3 mm to 7 mm, optionally in dependence on the diameter of the glass platelet 5; therefore, when producing the present mirror 1 it is proceeded such that a relatively thick glass platelet with plane parallel surfaces, is attached to the layer structure 2; 3 which previously has been produced on the carrier substrate 4. This procedure is illustrated in FIG. 5, wherein the thick, plane-parallel glass platelet is denoted by 15. When the glass platelet 15 has been attached to the layer structure 2; 3 by optically contacting at the interface 6'—where a high measure of evenness, in the order of $\frac{1}{6}$ to $\frac{1}{100}$ of the wave length 1 of the light beams or laser beams, respectively, is required and where inclusions or impurities must be avoided (so that suitably the optical contacting is carried out in a clean-room) the glass platelet 15 is reduced by a conventional polishing technique to the shape of the wedge-shaped glass platelet 5, as indicated in FIG. 5 by broken lines—corresponding to the inclined front face 5' ac-cording to FIG. 1. After this procedure of attaching the wedge-shaped glass platelet 5 by fastening a thicker glass platelet 15 by means of optical contacting and subsequently removing a part of the thickness of this glass platelet 15 so as to obtain the wedge-shaped glass platelet 5, suitably the anti-reflection coating 10 described before by way of FIG. 1 is applied to the front face 5' of the wedge-shaped glass platelet 5.

Prior to the inclined polishing of the glass platelet 15 for obtaining the wedge-shaped glass platelet 5, a thermal treatment of the bond of the glass platelet 15 to the layer structure 2; 3 can be effected so as to stabilize this bond—at the interface 6'—and to ensure a greater resistance to environmental influences, such as temperature fluctuations and humidity.

The invention claimed is:

1. A method of producing a multilayer mirror comprising the steps of:
   providing an optically polished carrier substrate;
   applying a plurality of individual layers having different optical constants and different thicknesses to the carrier substrate,
   the individual layers adjoining each other via parallel, plane surfaces;
   wherein the carrier substrate is thick as compared to the individual layers;
   fastening a wedge-shaped glass platelet to the outermost individual layer facing away from the carrier substrate by optical contact; and
   polishing the glass-platelet to reduce the thickness thereof and to provide a wedge shape therefor.

2. A method according to claim 1, wherein said glass platelet has a thickness such that a surface evenness of between $\mu/4$ and $\mu/10$ can be obtained thereon.

3. A method according to claim 1, further including the step of applying a thermal treatment to improve the longtime stability of the mirror.

4. A dispersive multilayer mirror, said mirror having an optical axis corresponding to a direction of light beam impingement, said mirror comprising:
   several individual layers applied to a carrier substrate and adjoining each other via parallel, plane surfaces which are oriented at right angles with respect to the optical axis,
   said individual layers having different optical constants and different thicknesses; and
   a wedge-shaped glass platelet on the outermost individual layer facing away from the carrier substrate,
   an outer surface of said platelet being oriented such that light impinges thereon at an angle differing from a right angle,
   wherein said wedge-shaped glass platelet is fastened by optical contacting to the outermost individual layer.

5. A multilayer mirror according to claim 4, further including an anti-reflection coating applied on the wedge-shaped glass platelet.

* * * * *